United States Patent
Zhang et al.

(10) Patent No.: US 9,467,265 B2
(45) Date of Patent: Oct. 11, 2016

(54) METHOD AND ACCESS POINT FOR ASSIGNING SOUNDING RESOURCES

(75) Inventors: Zhan Zhang, Beijing (CN); Huaisong Zhu, Beijing (CN)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 15 days.

(21) Appl. No.: 14/407,226

(22) PCT Filed: Jul. 3, 2012

(86) PCT No.: PCT/CN2012/000915
§ 371 (c)(1),
(2), (4) Date: Dec. 11, 2014

(87) PCT Pub. No.: WO2014/005242
PCT Pub. Date: Jan. 9, 2014

(65) Prior Publication Data
US 2015/0188683 A1    Jul. 2, 2015

(51) Int. Cl.
| | |
|---|---|
| H04L 5/00 | (2006.01) |
| H04J 11/00 | (2006.01) |
| H04L 5/14 | (2006.01) |
| H04L 1/00 | (2006.01) |
| H04B 7/06 | (2006.01) |

(52) U.S. Cl.
CPC ........... *H04L 5/0051* (2013.01); *H04B 7/0617* (2013.01); *H04J 11/0056* (2013.01); *H04L 1/0007* (2013.01); *H04L 5/006* (2013.01); *H04L 5/0048* (2013.01); *H04L 5/14* (2013.01); *H04L 5/1469* (2013.01)

(58) Field of Classification Search
CPC ... H04L 1/0007; H04L 5/0048; H04L 5/006; H04L 5/14; H04B 7/0617; H04J 11/0056
See application file for complete search history.

(56) References Cited

U.S. PATENT DOCUMENTS

| | | | |
|---|---|---|---|
| 2008/0233992 A1* | 9/2008 | Oteri | H04W 52/241 455/522 |
| 2009/0034468 A1* | 2/2009 | Muharemovic | H04W 72/1273 370/330 |
| 2009/0239473 A1 | 9/2009 | Lee et al. | |
| 2009/0279459 A1* | 11/2009 | Muharemovic | H04J 11/005 370/280 |
| 2010/0041410 A1* | 2/2010 | Englund | H04W 72/1268 455/450 |
| 2012/0052899 A1* | 3/2012 | Wang | H04W 52/226 455/513 |
| 2012/0127932 A1* | 5/2012 | Gao | H04L 5/0035 370/329 |
| 2012/0275394 A1* | 11/2012 | Gunnarsson | H04W 28/048 370/329 |
| 2012/0276937 A1* | 11/2012 | Astely | H04W 72/082 455/501 |
| 2014/0036859 A1* | 2/2014 | Ekpenyong | H04W 72/042 370/330 |

FOREIGN PATENT DOCUMENTS

| | | |
|---|---|---|
| WO | 2007051480 A1 | 5/2007 |
| WO | 2008092849 A1 | 8/2008 |
| WO | 2012011658 A2 | 1/2012 |

\* cited by examiner

*Primary Examiner* — Brian D Nguyen
(74) *Attorney, Agent, or Firm* — Patents on Demand P.A.; Brian K. Buchheit; Scott M. Garrett

(57) ABSTRACT

The embodiments disclose a method and an Access Point (AP) for assigning a sounding resource in a Time Division Duplex (TDD) cellular network. The method obtains a channel information between a serving AP and a User Equipment (UE) served by the serving AP, determines whether to assign the sounding resource to the UE according to the predetermined assigning criteria based on the channel information, and makes the sounding resource assignment if it is determined to assign the sounding resource to the UE.

19 Claims, 3 Drawing Sheets

METHOD AND ACCESS POINT FOR ASSIGNING SOUNDING RESOURCES

TECHNICAL FIELD

The present technology generally relates to wireless communication, particularly to a method and Access Point (AP) for assigning sounding resources in a wireless communication network.

BACKGROUND

In a radio air-interface of cellular networks, the more the channel status information (CSI) is available at the transmission side of access point (AP), the better downlink (DL) performance the system can achieve. Though uplink (UL) and downlink (DL) are facing different interferences, the channel reciprocity of Time Division Duplex (TDD) systems enables effective and accurate uplink/downlink channel information sharing between the access point (AP) and the user equipment (UE). Thus, by taking this advantage, TDD system can employ the shared comprehensive channel information to further improve the downlink performance.

However, owing to contradiction between a large number of UEs and the limited feedback capacity or sounding capacity of the existing system, only partial or coarse CSI of the downlink is available at access point for each UE.

SUMMARY

Therefore, it is an object to solve at least one of the above-mentioned problems.

According to an aspect of the embodiments, there is provided a method in a AP for assigning sounding resources in a TDD cellular network which includes the AP and a plurality of user equipments. The method comprises obtaining a channel information between a serving AP and a UE served by the serving AP; based on the channel information, determining whether to assign the sounding resource to the UE according to the predetermined assigning criteria; And making the sounding resource assignment if it is determined to assign the sounding resource to the UE.

According to another aspect of the embodiments, there is provided a AP in a TDD cellular network which includes a plurality of UEs. The AP comprises an obtaining unit, a determining unit, an assigning unit. The obtaining unit may obtain a channel information between a serving AP and a UE served by the serving AP, the determining unit may determine whether to assign the sounding resource to the UE according to the predetermined assigning criteria based on the channel information, the assigning unit may make the sounding resource assignment if it is determined to assign the sounding resource to the UE.

By means of dynamically assigning the sounding resources to the UEs within a serving cell, the limited radio resources of UL sounding is optimally distributed. Specifically, it mitigates the problem that, a large number of UEs have to be accommodated in a cellular system while the channel sounding capacity is limited, though only some of them contribute most of the system throughput. The channel spectrum utilization in the sounding channel is optimized.

BRIEF DESCRIPTION OF THE DRAWINGS

The technology will now be described, by way of example, based on embodiments with reference to the accompanying drawings, wherein.

DETAILED DESCRIPTION

Figure 1:
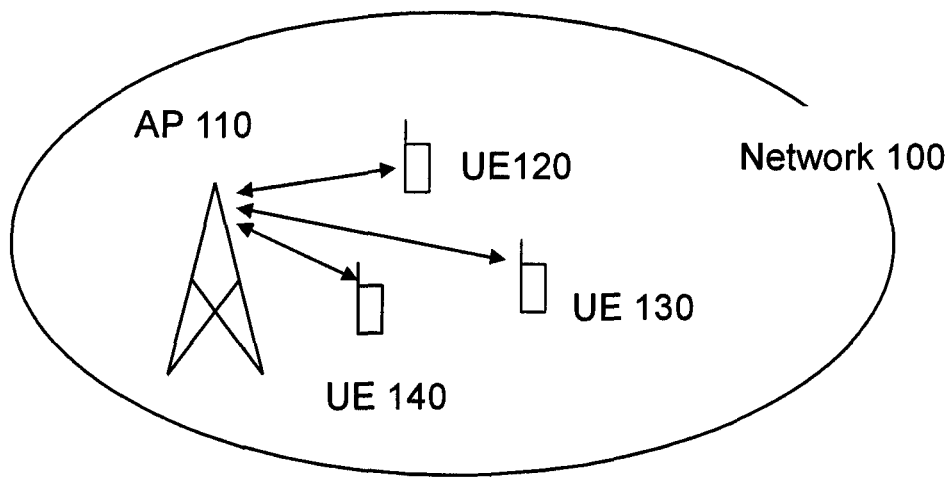
FIG. 1 illustrates a schematic view of a wireless communication network environment suitable for in implementing an embodiment.

Embodiments herein will be described more fully hereinafter with reference to the accompanying drawings, in which embodiments are shown. This embodiments herein may, however, be embodied in many different forms and should not be construed as limited to the embodiments set forth herein. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

The present technology is described below with reference to block diagrams and/or flowchart illustrations of methods, apparatus (systems) and/or computer program products according to the present embodiments. It is understood that blocks of the block diagrams and/or flowchart illustrations, and combinations of blocks in the block diagrams and/or flowchart illustrations, may be implemented by computer program instructions. These computer program instructions may be provided to a processor, controller or controlling unit of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present technology may be embodied in hardware and/or in software (including firmware, resident software, micro-code, etc.). Furthermore, the present technology may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that may contain, store, communicate, propagate, or transport the program for use by or in connection with the instruction execution system, apparatus, or device.

Although the technology herein is described with reference to the LTE communication network in the context, it should understand that the embodiments are not limited to this, but may indeed be applied to all suitable wireless communication networks involved in sounding resources assignment. Although specific terms in some specifications are used here, such as eNB, it should be understand that the embodiments are not limited to those specific terms but may be applied to all similar entities, such as macro base station, femto base stations and Core Network (CN).

Take the Time Division—Long Term Evolution (TD-LTE) system as example, the sounding signal (sounding reference signal (SRS)) has been standardized to facilitate CSI acquisition, which is a prerequisite for the schemes of non-codebook beam forming (BF) weight calculation based on reciprocity. At present, most of current reciprocity based system design assumes CSI obtained from UE sounding process, however, whenever the number of the UE increases, the sounding resource assigned to one UE becomes very limited. In such a situation, owing to limited time-frequency sounding resources, the CSI obtained at AP from the eNodeB (eNB) is either relatively obsolete or inaccurate due to frequency selectivity and vulnerability to sounding interference.

Embodiments herein will be described below with reference to the drawings.

FIG. 1 illustrates a schematic view of a wireless communication network environment suitable for in implementing an embodiment.

As shown in FIG. 1, the wireless communication network 100 comprises the AP 110 and three UEs 120, 130 and 140. In the operation, the channel information, such as the uplink and downlink channel quality information, path gain information, and the like, is communicated between the AP and the UE. The term "AP" used herein may indicate any type of communication node, such as base station, eNB, NodeB and so on. The term "UE" used herein may indicates all forms of devices enabling the user to communicate via wireless communication network, such as, smart phones, cellular phone, Personal Digital Assistant (PDA), and the like. The wireless communication network comprises, but not limited to, the TD-LTE network. For simplicity and clarity, only one AP and three UEs are shown in the wireless communication network 100, it will be appreciated that one or more APs may exist in the wireless communication network, and each AP may serve one or more UEs in the mean time.

Figure 2:
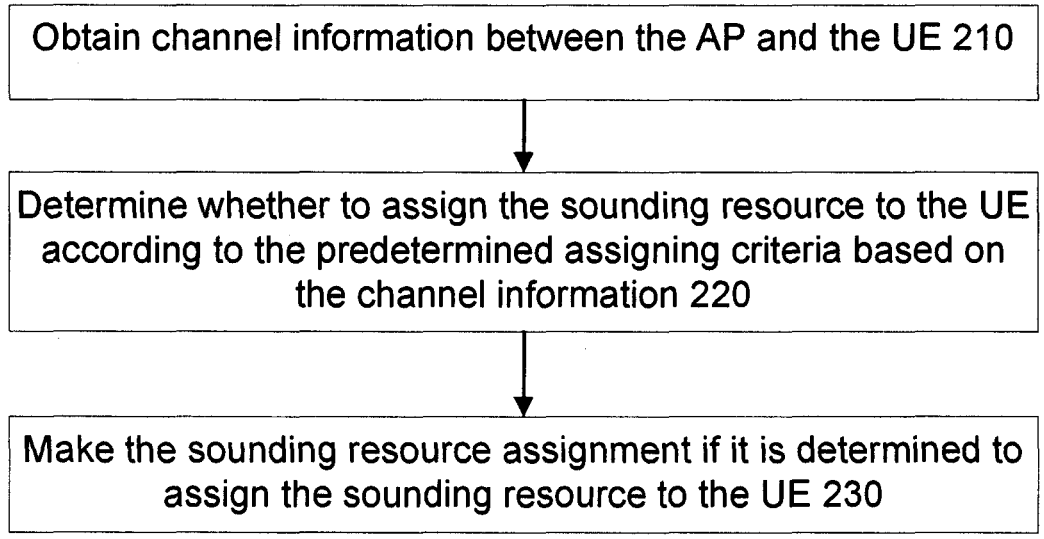
FIG. 2 illustrates a flowchart of a method for assigning sounding resources by an AP in a TDD cellular network in accordance with an embodiment.

FIG. 2 illustrates a flowchart of a method for assigning a sounding resource by an AP in a TDD cellular network in accordance with an embodiment.

In step 210, the AP 110 may obtain a channel information between the AP 110 and a UE among the UEs 120-140 served by the AP 110. Here, the channel information comprises path gain information. The path gain information can be represented as path-loss related information which can be obtained, but not limited to, in the following ways:

The AP 110 receives the downlink Reference Signal Received Power (RSRP) measurement reported from the UE (e.g. UE 120). Here, the RSRP may refer to the linear average over the power contributions of the resource elements that carry cell-specific reference signals within the considered measurement frequency bandwidth, and it can be measured on the UE side. After receiving the DL RSRP measurement value, the AP 110 may, for example, compare the DL RSRP measurement value with the predetermined original reference signal power. If the RSRP measurement value is close to the predetermined original reference signal power value, it means that, in the reference signal transmission from the AP 110 to the UE 120, the reference signal power loss is small, which indicates that the channel path gain between the AP 110 and the UE 120 is high. In other words, the bigger the DL RSRP measurement value is, the higher the path gain of channel between the AP 110 and the UE 120 is, or say, the lower the path loss of the channel between the AP 110 and the UE 120. Herein, unless otherwise stated, the channel between the AP and the UE herein stands for both DL channel and UL channel between the AP and the UE, since they are the same one in the TDD cellular network.

The AP 110 receives the uplink transmission power headroom measurement reported from the UE (e.g. UE 120). The uplink transmission power headroom may be defined as an average value of the UE transmission power headroom over the measurement period, and it can be measured on the UE side. It will be appreciated that the uplink transmission power headroom may be measured in any other suitable ways. If the uplink transmission power headroom status to transmit the specific signals from the UE to the AP is higher, it may be considered that the channel between the AP and the UE is in good condition, that is, the path gain of the channel between the AP and the UE is higher. For example, the uplink transmission power headroom reported from the UE 120 is 10 which is less than the uplink transmission power headroom reported from the UE 140 20. Thus, the path gain of the channel between the UE 120 and the AP 110 is lower than that between the UE 140 and the AP 110.

It will be understood that the AP 110 can obtain the above mentioned information from the UE (e.g. 120-140) in various ways. For example, the AP 110 may send the request to obtain the needed information to the UEs side, and the UEs return the needed information in response to the request.

In step 220, based on the channel information between the UE (e.g. 120) and the AP 110 obtained in step 210, the AP 110 may determine whether to assign the sounding resource to the UE 120 according to the predetermined assigning criteria. If the channel information is represented as the channel path gain information, the predetermined assigning criteria may comprise, but not limited to, the followings:

Prioritizing the UEs (e.g. 120-140) in accordance with the respective path gain information and the UE with the highest path gain will be authorized to obtain the sounding resources assignment. For instance, provided that the DL RSRP measurement values reported from the 130 is the highest among the UEs, according to the relationship between the DL RSRP measurement values and the path gain as mentioned above, it can be known that the UE 130 owns the highest path gain, therefore it will have the highest priority to be assigned with the sounding resources.

Comparing the path gain information (e.g. uplink transmission power headroom) of the UEs with the predetermined headroom threshold information. The uplink transmission power headroom may be used to indicate the uplink transmission power consumption status for the transmission in the channel from the UE to the AP. The channel in good condition needs low transmission power, thus the UE with the higher UL transmission power headroom will be likely to obtain the sounding resources. For instance, if the uplink transmission power headroom of the UE is higher than the threshold, then it will be prioritized to be assigned with the sounding resources.

It should be appreciated that the above predetermined assigning criteria simply are descried by way of example, and any suitable assigning criteria can be set for the sounding resources assignment determination.

In step 230, the AP 110 then may make the sounding resource assignment for one or more UEs that have been determined to be assigned the sounding resources in step 220. Specifically, the sounding resource includes the time-frequency sounding resources. The AP 110 may firstly check if there are unoccupied sounding resources, for example, in the sounding resource database. If yes, then the AP 110 may assign the qualified UE with the predetermined amount of time-frequency sounding resources. Thereby, the qualified UE may, for example, make use of the assigned time-frequency sounding resources to transmit the sounding signaling, such as the sounding reference signal (SRS) in LTE network.

In view of the above embodiment, the sounding resources are dynamically assigned to the UE based on the channel information between the UE and its serving AP, those UEs meeting the assigning criteria can only be assigned with the sounding resource. In other words, instead of assigning the sounding resources to all the UEs, some UEs with better channel condition will be qualified for being assigned with the sounding resources, while the others will not. Since the better channel condition, the benefit of the sounding process via the channel between the qualified UE and its serving AP is maximized, and therefore a higher beam forming performance can be expected.

In the embodiment, the AP 110 may not only obtain the channel information between the UEs (e.g. 120-140) and the AP 110, but also between the UEs and the interfering APs (not shown). The interfering APs can be the APs neighboring the AP 110. Here, the channel information further comprises the UL/DL channel quality information. Here, the UL/DL channel quality information may be indicated by, for example, the DL inter-cell interference, the UL inter-cell interference, the UL geometry including information of inter-cell interference and the DL geometry including information of inter-cell interference. It's well known that the inter-cell interference is an important indicator that represents the channel quality. That is, the lower the inter-cell interference of the channel between the UE and the AP is, the higher the quality of the channel is.

Specifically, the DL inter-cell interference may be indicated by the Channel Quality Indicator (CQI) reported from the UE, or certain post-processing value/vector/matrices based on the DL measurement on the UE side. The UL inter-cell interference may be indicated by the channel quality measurement by the serving AP. The UL or DL geometry including inter-cell interferences may, for example, be indicated by the UE report reflected path loss difference measurement, which refers to the difference of the channel path loss between the UE and its serving AP and the channel path loss between the UE and the interfering APs. For instance, through 3GPP 36.331 A3 event measurements, the difference values can be reported to the AP from the UE.

Accordingly, when the channel information comprises the UL/DL channel quality information, the predetermined assigning criteria can be set based on the UL/DL channel quality information. For example, the UE with the maximum DL path loss difference, which indicates the minimum DL inter-cell interference, will be assigned with the sounding resources.

Alternatively, the predetermined assigning criteria (e.g. referred to as criteria A) based on the path gain information and the predetermined assigning criteria (e.g. referred to as criteria B) based on the channel quality information can be combined to determine whether to assign the sounding resource to the UEs. For instance, the formula below can be used to get the final priority metric:

Priority=Weight_$A$*Priority(criteria $A$)+Weight_$B$*Priority(criteria $B$)

Wherein, weight_A and weight_B is operator configurable value;
Priority (criteria A)=RSRP (UE reported)/min_RSRP;
Priority (criteria B)={RSRP Differences (UE reported)}/min_RSRP_difference,
min_RSRP, min_RSRP_difference are operator configurable values.

By involving the channel quality information, such as the UL/DL inter-cell interference in the UE prioritization, the UE with better channel condition can be identified more accurately. Meanwhile, it enables to prevent the UE from generating interference to the neighboring cells during the sounding process as much as possible. The sounding interference avoidance is taken into account at the stage of sounding resource assigning, which contributes to the overall system performance enhancement.

In the embodiment, the determination whether to assign the sounding resource may also be based on the limitation of the served UE number being able to obtain the sounding resource assignment. Specifically, it can limit the number of the UEs capable of obtaining the sounding resources assignment in the mean time. Take the TD-LTE system as an example, if the maximum 16 is assumed to be a limit number, assignment of SRS resources is divided equally in dimensions of time period and frequency, eNB will divide SRS resources in code, time and frequency domains into totally 16 sets (e.g. [code domain multiplex: 4] times [time domain multiplex: 2] times [frequency domain multiplex: 2]=4*2*2=16 sets). Each UE will get only one set of resources. It will be appreciated that the SRS resources assignment is not limited to the equal division, and can be performed in any other suitable way. Furthermore, if the number of the UEs currently having obtained the sounding resource reaches the limit, then the UE will not be assigned with the sounding resource.

Figure 3:
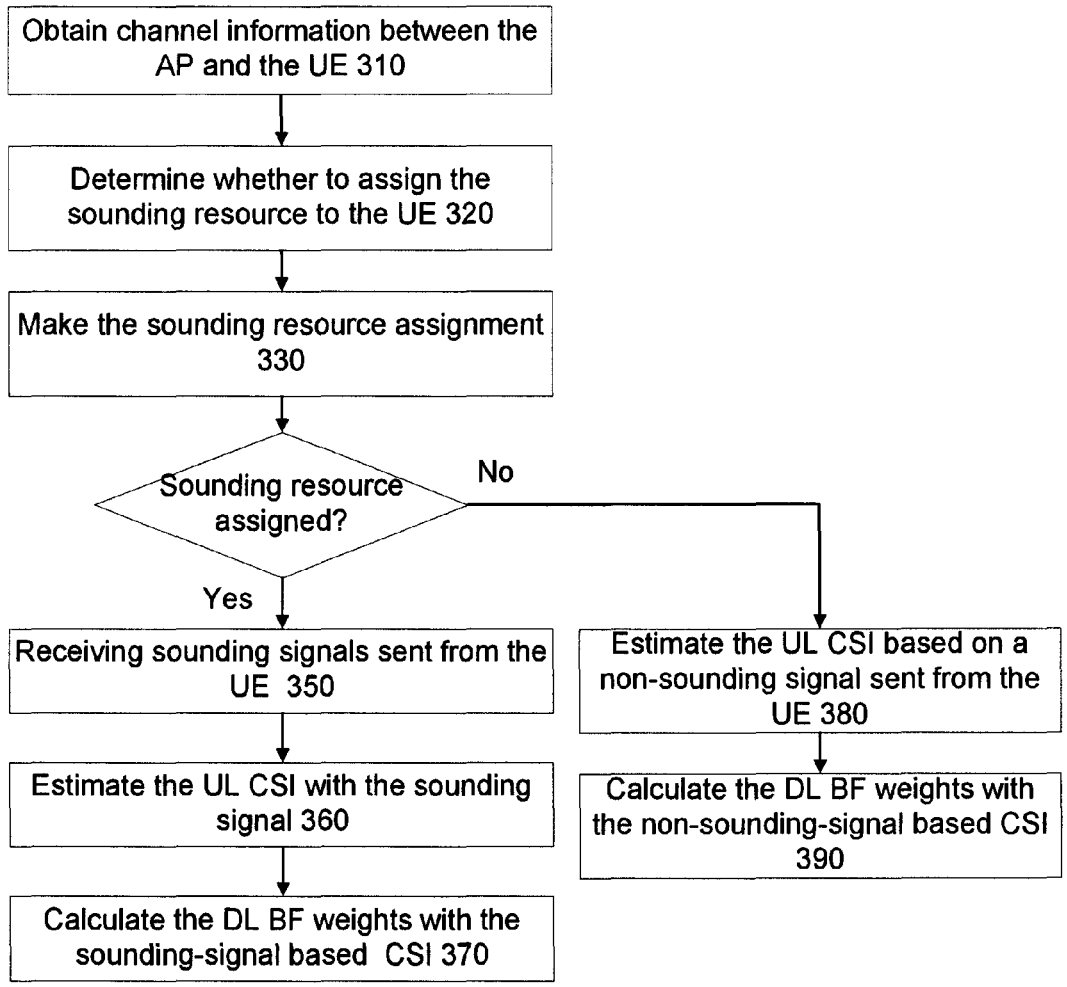
FIG. 3 illustrates a flowchart of a method for assigning a sounding resource by an AP in a TDD cellular network in accordance with an embodiment.

FIG. 3 illustrates a flowchart of a method for assigning a sounding resource by an AP in a TDD cellular network in accordance with another embodiment In the embodiment, the step 310, 320 and 330 simply work in the similar way to the step 210, 220 and 230 respectively, which will not be repeated for purpose of simplicity.

In the case that the UE obtains the sounding resource, the UE will utilize the assigned sounding resource to send the sounding signal (e.g. the UL SRS in the LTE network) to the serving AP, the AP then will receive the sounding signal sent from the UE (step 350).

Subsequently, the AP may estimate the UL Channel State Information (CSI) by comparing the received sounding signal with the original sounding signal (step 360), the original sounding signal that corresponds to the received sounding signal is known to the AP. Here, the Channel State Information (CSI) may refer to known channel properties of a communication link. This information describes how a signal propagates from the transmitter to the receiver and represents the combined effect of, for example, scattering, fading, and power decay with distance. The CSI estimation process is known to the skilled in the art, which will not be described in more detail here. In practice, the CSI may be represented as a channel matrix.

After estimating the CSI, the AP may then calculate the DL Beam Forming (BF) weights with the estimated CSI (step 370). Specifically, the DL BF weights may be represented as a matrix, which can be calculated with the CSI channel matrix by the matrix transformation. Since the matrix transformation from the CSI channel matrix to the DL BF weights matrix is known in the art, it will not be described in more detail here.

Note that the BF types comprise the non-frequency-selective BF and the frequency-selective BF. If the UE is assigned with the sounding resources, the type of BF may be directly determined to be the frequency-selective BF, and accordingly, the frequency-selective DL BF weights will be calculated with the estimated CSI. In this case, the BF calculation is supposed to fully employ the sounding based CSI by weight calculation at as small as possible frequency granularity to have a frequency-selective BF.

On the other hand, in the case that the UE is not assigned with the sounding resource, the serving AP may estimate the UL CSI based on a non-sounding signal sent from the UE (step 380). Herein, the non-sounding signal comprises the UL Demodulation Reference Signal (DRS) or the UL payload data signal, which can be measured by the AP. Specifically, after receiving the UL DRS and/or UL payload data signal from the UE, the serving AP may estimate the UL CSI by comparing the received UL DRS and/or the received UL payload data signal with their original ones respectively which may be known to or estimated by the serving AP. Here, the way to estimate the UL CSI is similar to that in the step 360.

Subsequently, the AP may calculate the DL Beam Forming (BF) weights with the estimated CSI obtained in the step 380 (step 390). The specific calculation process is similar to that in step 370 and will not be repeated for simplicity.

Alternatively, the AP may firstly determine the type of BF according to the BF type determination rules, and then calculate the weights of the type-determined DL BF weights with the estimated CSI. Specifically, if the latest UL DRS allocated bandwidth reported from the UE covers the DL band assignment to be used for the DL transmission by the serving AP, then the BF type will be determined to be the frequency-selective BF, otherwise the BF type will be determined to be the non-frequency-selective BF. Moreover, if the time difference between the time for the latest UL measurement that is used to obtain the UL CSI and the time for the scheduled DL BF weights utilization based on this measurement is within channel coherent time, that is, the obtained UL CSI is fresh enough for the DL BF weights calculation, then the BF type will be determined to be the frequency-selective BF, otherwise the BF type will be determined to be the non-frequency-selective BF.

For the UEs without UL sounding resources, in most case the DL transmission to them may have a grid-of-beam-selection calculation in non-frequency-selective fashion possessing the low computing complexity, which balance the DL BF computing complexity and the overall system performance. Meanwhile, most of the UEs that contribute to the system throughput can be prioritized to obtain their sounding resources, and hence the relatively accurate CSI by the sounding resources can be fully exploited.

Figure 4:
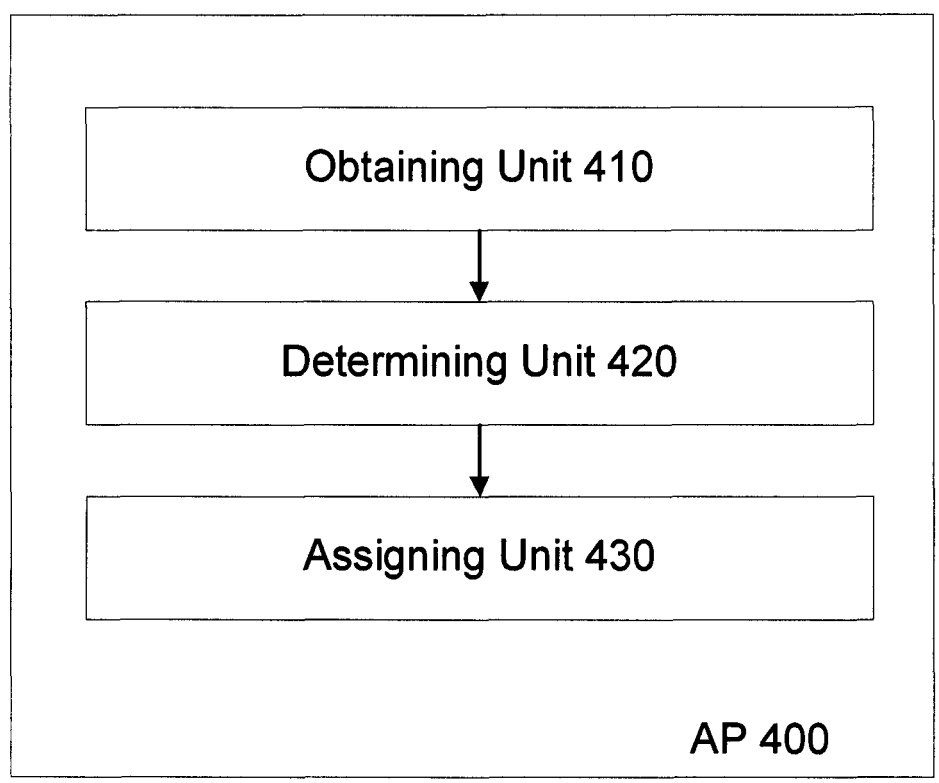
FIG. 4 illustrates a block diagram of the AP in a TDD cellular network according to an embodiment.

FIG. 4 illustrates a block diagram of the AP in a TDD cellular network according to a further embodiment.

As illustrated in the FIG. 4, the AP may comprise the obtaining unit 410, determining unit 420 and assigning unit 430. It should be appreciated that the AP is not limited to the shown elements, and can comprise other conventional elements and the additional elements for other purposes.

The obtaining unit 410 may obtain a channel information between the AP (e.g. 110) and a UE among the UEs (e.g. 120-140) served by the AP 110. Here, the channel information comprises path gain information. The path gain information, for example, can be represented as path-loss related information, which can be obtained, but not limited to, in the following ways:

The obtaining unit 410 receives the downlink Reference Signal Received Power (RSRP) measurement reported from the UE (e.g. 120). Here, the RSRP refers to the linear average over the power contributions of the resource elements that carry cell-specific reference signals within the considered measurement frequency bandwidth, and it can be measured on the UE side. After receiving the DL RSRP measurement value, the obtaining unit 410 may, for example, compare the DL RSRP measurement value with the predetermined original reference signal power. If the RSRP measurement value is close to the predetermined original reference signal power value, it means that, in the reference signal transmission from the AP 110 to the UE 120, the reference signal power loss is small, which indicates that the channel path gain between the AP 110 and the UE 120 is high. In other words, the bigger the DL RSRP measurement value is, the higher the path gain of the channel between the AP 110 and the UE 120 is, or say, the lower path loss of the channel between the AP 110 and the UE 120.

The obtaining unit 410 receives the uplink transmission power headroom measurement reported from the UE (e.g. 120). The uplink transmission power headroom may be defined as an average value of the UE transmission power headroom over the measurement period, and it can be measured on the UE side. If the uplink transmission power headroom to transmit the specific signals from the UE to the AP is high, it may be considered that the channel between the AP and the UE is in good condition, that is, the path gain of the channel between the AP and the UE is higher. For example, the uplink transmission power headroom reported from the UE 120 is larger than the uplink transmission power headroom reported from the UE 140. Thus, the path gain of the channel between the UE 120 and the AP 110 is higher than that between the UE 140 and the AP 110.

It will be understood that the AP 110 can obtain the above mentioned information from the UE (e.g. 120-140) in various ways. For example, the AP 110 may send the request to obtain the needed information to the UEs side on the regular basis, and the UEs return the needed information in response to the request.

Based on the channel information between the UE (e.g. 120) and the AP 110 obtained in the obtaining unit 410, the determining unit 420 may determine whether to assign the sounding resource to the UE 120 according to the predetermined assigning criteria. If the channel information is represented as the channel path gain information, the predetermined assigning criteria may comprise, but not limited to, the followings:

Prioritizing the UEs (e.g. 120-140) in accordance with the respective path gain information and the UE with the highest path gain will be authorized to obtain the sounding resources assignment. For instance, provided that the DL RSRP measurement values reported from the UE 130 is the highest among the UEs, according to the relationship between the DL RSRP measurement values and the path gain as mentioned above, it can be known that the UE 130 owns the highest path gain, therefore it will have the highest priority to be assigned with the sounding resources.

Comparing the path gain information (e.g. uplink transmission power headroom) of the UEs with the predetermined headroom threshold information. For instance, if the uplink transmission power headroom of the UE is higher than the threshold, then it will be prioritized to be assigned with the sounding resources.

It should be appreciated that the above predetermined assigning criteria simply are descried by way of examples, and any suitable assigning criteria can be used for the sounding resources assignment determination.

Then, the assigning unit 430 may make the sounding resource assignment for one or more UEs that have been determined to be assigned with the sounding resources by the determining unit 420. Specifically, the sounding resource includes the time-frequency sounding resources. The assigning unit 430 may firstly check if there are unoccupied sounding resources, for example, in the sounding resource database. If yes, then the AP 110 may assign the qualified UE with the predetermined amount of time-frequency sounding resources. Thereby, the qualified UE may make use of the assigned time-frequency sounding resources to transmit the sounding signaling, such as the sounding reference signal (SRS) in LTE network, to the AP.

In view of the above embodiment, the sounding resources are dynamically assigned to the UE based on the channel information between the UE and its serving AP, those UEs meeting the assigning criteria can only be assigned with the sounding resource. In other words, instead of assigning the sounding resources to all the UEs, some UEs with better channel condition will be qualified for being assigned with the sounding resources, while the others will not. Due to the better channel condition, the benefit of the sounding process via the channel between the qualified UE and its serving AP is maximized, and therefore a higher beam forming performance can be expected.

In the embodiment, the obtaining unit 410 may not only obtain the channel information between the UEs (e.g. 120-140) and the AP 110, but also between the UEs and the interfering APs (not shown). The interfering APs can be the APs neighboring the AP 110. Here, the channel information further comprises the UL/DL channel quality information. Here, the UL/DL channel quality information may be indicated by, for example, the DL inter-cell interference, the UL inter-cell interference, the UL geometry including information of i inter-cell interference and the DL geometry including information of inter-cell interference. It's well known that the inter-cell interference is an important indicator that represents the channel quality. That is, the lower the inter-cell interference of the channel between the UE and the AP is, the higher the quality of the channel is.

Specifically, the DL inter-cell interference may be indicated by the Channel Quality Indicator (CQI) reported from the UE, or certain post-processing value/vector/matrices based on the DL measurement on the UE side. The UL inter-cell interference may be indicated by the channel quality measured by the serving AP. The UL or DL geometry indicating inter-cell interferences may, for example, be indicated by the UE report reflected loss difference measurement, which refers to the difference of the channel path loss between the UE and its serving AP and the channel path loss between the UE and the interfering APs. For instance, through 3GPP 36.331 A3 event measurements, the difference values can be reported to the AP from the UE.

Accordingly, when the channel information comprises the UL/DL channel quality information, the predetermined assigning criteria can be set based on the UL/DL channel quality information. For example, the UE with the maximum DL path loss difference, which indicates the minimum DL inter-cell interference, will be assigned with the sounding resources.

Alternatively, the predetermined assigning criteria (for example, referred to as criteria A) based on the path gain information and the predetermined assigning criteria (for example, referred to as criteria B) based on the channel quality information can be combined to determine whether to assign the sounding resource to the UEs. For instance, the formula below can be used to get the final priority metric:

$$Priority=Weight\_A*Priority(criteria\ A)+Weight\_B*Priority(criteria\ B)$$

Wherein, weight_A and weight_B is operator configurable value;

Priority (criteria A)=RSRP (UE reported)/min_RSRP;

Priority (criteria B)={RSRP Differences (UE reported)}/min_RSRP_difference, min_RSRP, min_RSRP_difference are operator configurable value.

By involving the channel quality information, for example, the UL/DL inter-cell interference in the UE prioritization, the UE better channel condition can be identified more accurately. Meanwhile, it enables to prevent the UE from generating interference to the neighboring cells during the sounding process as much as possible. The sounding interference avoidance is taken into account at the stage of sounding resource assigning, which contributes to the overall system performance enhancement.

As a variation of the embodiment, the determination whether to assign the sounding resource may also be based on the limitation of the served UE number being able to obtain the sounding resource assignment. Specifically, it can limit the number of the UEs served by the AP (e.g. 110) that can be able to obtain the sounding resources assignment in the mean time. Take the TD-LTE system as an example, if maximum 16 is assumed to be a limit number, assignment of SRS resources is divided equally in dimensions of time period and frequency, eNB will divide SRS resources in code, time and frequency domains into totally 16 sets (e.g. [code domain multiplex: 4] times [time domain multiplex: 2] times [frequency domain multiplex: 2]=4*2*2=16 sets). Each UE will get only 1 set of resources. It will be appreciated that the SRS resources assignment is not limited to the equal division, and can be performed in any suitable way. Furthermore, if the number of the UEs, which currently have obtained the sounding resource, reaches the limit, then the UE will not be assigned with the sounding resource.

While the embodiments have been illustrated and described herein, it will be understood by those skilled in the art that various changes and modifications may be made, and equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

The invention claimed is:

1. A method for assigning a sounding resource by an Access Point (AP) in a Time Division Duplex (TDD) cellular network, the method comprising:
   obtaining channel information between a serving AP and a User Equipment (UE) served by the serving AP;
   determining whether to assign the sounding resource to the UE according to a predetermined assigning criteria and based on the channel information, wherein the channel information comprises at least one of path gain information and Uplink/Downlink (UL/DL) channel quality information, and wherein the predetermined assigning criteria prioritize UEs having smaller path-loss and/or suffering/generating less UL/DL inter-cell interference;
   making the sounding resource assignment if it is determined to assign the sounding resource to the UE.

2. The method of claim 1, wherein the obtaining channel information comprises obtaining channel information between the serving AP and the UE, and between interfering APs and the UE.

3. The method of claim 1, wherein the determining comprises determining whether to assign the sounding resource to the UE according to the predetermined assigning criteria and based on the channel information and a limitation of a number of served UE able to obtain the sounding resource assignment.

4. The method of claim 1, further comprising, if the UE is assigned the sounding resource:
   receiving a sounding signal sent from the UE assigned sounding resource;
      estimating an Uplink (UL) Channel State Information (CSI) by comparing the received sounding signal with a known original signal corresponding to the received sounding signal;
      calculating Downlink (DL) Beam Forming (BF) weights with the estimated CSI.

5. The method of claim 4, wherein the sounding signal is a UL Sounding Reference Signal.

6. The method of claim 4, wherein the calculating comprises:
   determining a type of BF from a plurality of BF types;
   calculating weights of type-determined DL BF weights with the estimated CSI.

7. The method of claim 6, wherein the BF types comprise a non-frequency-selective BF and a frequency-selective BF.

8. The method of claim 7, wherein the determining comprises determining, in response to the UE being assigned the sounding resource, that the type of BF is the frequency-selective BF.

9. The method of claim 1, further comprising, if the UE is not assigned the sounding resource:
   estimating an Uplink (UL) Channel State Information (CSI) based on a non-sounding signal sent from the UE;
   calculating Downlink (DL) Beam Forming (BF) weights with the estimated CSI.

10. The method of claim 9, wherein the non-sounding signal comprises at least one of a UL Demodulation Reference Signal (DMRS) and a UL payload data signal.

11. The method of claim 9, wherein the calculating comprises:
    determining a type of BF from a plurality of BF types;
    calculating weights of type-determined DL BF weights with the estimated CSI.

12. The method of claim 11, wherein the BF types comprise a non-frequency-selective BF and a frequency-selective BF.

13. The method of claim 12, wherein the determining comprises determining, in response to the UE being assigned the sounding resource, that the type of BF is the frequency-selective BF.

14. The method of claim 12, wherein the type of BF is determined based on at least one of:
    whether a latest UL Demodulation Reference Signal (DMRS) allocated bandwidth covers a DL band assignment by the serving AP;
    whether a time difference between a latest UL measurement and a scheduled DL BF weights utilization based on that measurement is within channel coherent time.

15. The method of claim 1, wherein the TDD cellular network is a Time Division-Long Term Evolution (TD-LTE) network.

16. An Access Point (AP) in a Time Division Duplex (TDD) cellular network, comprising:
    one or more processing circuits configured to function as:
    an obtaining circuit configured to obtain a channel information between a serving AP and a User Equipment (UE) served by the serving AP;
    a determining circuit configured to determine whether to assign a sounding resource to the UE according to a predetermined assigning criteria and based on the channel information, wherein the channel information comprises at least one of path gain information and Uplink/Downlink (UL/DL) channel quality information, and wherein the predetermined assigning criteria prioritize UEs having smaller path-loss and/or suffering/generating less UL/DL inter-cell interference;
    an assigning circuit configured to make the sounding resource assignment if it is determined to assign the sounding resource to the UE.

17. The AP of claim 16, wherein the obtaining circuit is configured to obtain the channel information between the serving AP and the UE, and between an interfering AP and the UE.

18. The AP of claim 16, wherein the determining circuit is configured to determine whether to assign the sounding resource to the UE according to the predetermined assigning criteria and based on the channel information and a limitation of a number of served UE able to obtain the sounding resource assignment.

19. A computer program product stored in a non-transitory computer readable medium for assigning a sounding resource by an Access Point (AP) in a Time Division Duplex (TDD) cellular network, the computer program product comprising software instructions which, when run on one or more processing circuits, causes the one or more processing circuits to:
    obtain channel information between a serving AP and a User Equipment (UE) served by the serving AP;
    determine whether to assign the sounding resource to the UE according to a predetermined assigning criteria and based on the channel information, wherein the channel information comprises at least one of path gain information and Uplink/Downlink (UL/DL) channel quality information, and wherein the predetermined assigning criteria prioritize UEs having smaller path-loss and/or suffering/generating less UL/DL inter-cell interference;

make the sounding resource assignment if it is determined to assign the sounding resource to the UE.

* * * * *